various patent office 2,950,322
Patented Aug. 23, 1960

2,950,322

METHOD OF PREPARING A VINYLPHENYL BOROXOLE

Arthur K. Hoffmann, Stamford, Conn., and Stephen J. Groszos, Cincinnati, and Walter M. Thomas, Noroton Heights, Ohio, assignors to American Cyanamid Company, New York, N.Y., a corporation of Maine No Drawing. Original application Sept. 6, 1957, Ser. No. 682,312. Divided and this application Aug. 19, 1959, Ser. No. 834,643

6 Claims. (Cl. 260—606.5)

This invention relates to a method of preparing new and useful boron compounds and more particularly is concerned with the production of vinylphenyl boroxoles.

The vinylphenyl boroxoles resulting from the method of this invention may be represented by the following general formula:

I.

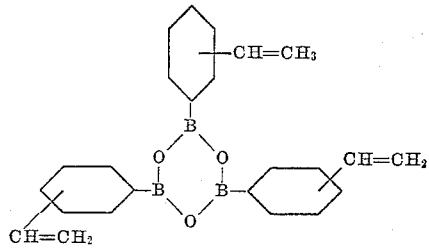

Compounds embraced by Formula I include o-, m- and p-vinylphenyl boroxoles, and the term "a vinylphenyl boroxole" as used generically herein and in the appended claims includes both the pure or substantially pure isomers of vinylphenyl boroxole, as well as any two or all three of the aforementioned isomers in any proportions.

(The phenyl radical represented, for purpose of simplicity, by the symbol

in Formula I and in other formulas that follow [including those in the appended claims] also is frequently represented by the symbol

in order to indicate the aromatic unsaturation; and, hence, the latter symbol could be substituted, if desired, for the symbol used for the phenyl radical in Formula I and other formulas appearing in the specification.)

The vinylphenyl boroxoles resulting from the method of this invention are useful as chemical intermediates and in numerous other applications where compounds containing boron in the molecule are useful. They may be employed as the active ingredient in, or as a useful additive to, a large variety of compositions including insecticides, bactericides, germicides, fungicides, pesticides and the like. They are particularly useful when homopolymerized and copolymerized. They can be copolymerized with each other and with other copolymerizable ingredients, more particularly compounds containing a $$CH_2=C<$$

grouping, as disclosed and claimed in copending application Serial No. 682,315 of Hoffman and Thomas, filed September 6, 1957, which application is directed to the production of homopolymers and copolymers of a vinylphenyl boroxole.

The o-, m- and p-vinylphenyl boroxoles (or mixtures of any two or all three of these isomers in any proportions) can be prepared by dehydrohalogenating, under anhydrous conditions and while admixed with a base, the corresponding alpha-X-ethylphenyl boroxole where X represents chlorine or bromine.

In order that those skilled in the art may better understand how the present invention can be carried into effect, the following examples are given by way of illustration and not by way of limitation. All parts and percentages are by weight unless otherwise stated.

EXAMPLE 1

A. *Preparation of intermediates used in making p-α-bromoethylphenyl boroxole*

(A) p-ETHYLBROMOBENZENE

To two kg. (18.85 moles) of ethylbenzene contained in a 5-liter, 3-necked, round-bottom flask equipped with a stirrer, addition funnel, reflux condenser and hydrogen-bromide trap, are added 100 g. of iodine and 3 g. of steel wool. Following solution of the iodine, 3083 g. (19.25 moles) of bromine are added at a rate such that the temperature of the reaction mixture does not exceed 60° C. After hydrogen-bromide evolution has ceased following completion of the bromine addition, the reaction mass is washed with excess 10% aqueous sodium hydroxide solution, and then with 10% aqueous sodium thiosulfate solution until colorless. After drying over solid sodium hydroxide, the product is distilled to obtain 3,306 g. (92% of the theoretical yield), B.P., 196°–215° C. The mixture of isomeric bromides is then fractionally distilled to separate the o- and p-isomers; pure para isomer, $n_D^{25}$ 1.5425.

(B) p-ETHYLPHENYLBORONIC ACID p-Ethylbromobenzene, 555 g. (3.0 moles), is added dropwise to 73 g. (3.15 moles) Mg in 1 liter of anhydrous ether (diethyl ether). After completion of the reaction, the ether solution of p-ethylphenyl-magnesium bromide is added dropwise under nitrogen pressure to a solution of 913 g. (3.98 moles) of n-butyl borate (tri-n-butyl borate) in 800 ml. of anhydrous ether cooled to −70° C. in a Dry Ice-acetone bath. After the addition of the Grignard solution has been completed, the reaction mixture is allowed to warm slowly to room temperature. The reaction mass is allowed to remain at ambient temperature for 12 hours before decomposition.

The reaction mass is decomposed by the addition of 1 liter of 10% aqueous sulfuric acid. The ether layer is separated, and evaporated on a water bath. Following the removal of ether, the butanol-water system is made alkaline with aqueous sodium hydroxide solution, and the butanol is removed by distillation in vacuo. Water is added from time to time to maintain a volume of about 3 liters. When the butanol has been removed, the aqueous solution is acidified with hydrochloric acid, and the resultant precipitate of p-ethylphenylboronic acid is filtered off, and recrystallized once from hot water. Yield: 378 g., 84% of the theoretical yield; M.P. 149°–150° C.

(C) p-ETHYLPHENYLBOROXOLE p-Ethylphenylboronic acid, 284 g. (1.9 moles) is refluxed in 1 liter of toluene in a flask fitted with a Dean and Stark trap to remove water. When water no longer appears in the condensate, the toluene is removed by vacuum evaporation to yield crystalline p-ethylphenylboroxole, M.P. 194°–195° C.

B. Preparation of p-α-bromoethylphenylboroxole p-Ethylphenylboroxole, 147 g. (0.372 moles), is dissolved in 3.25 liters of anhydrous carbon tetrachloride. N-bromosuccinimide, 200 g. (1.125 moles), is added and the reaction mixture is heated to reflux. A free-radical catalyst, specifically benzoyl peroxide, 1.0 g., is then added to initiate the reaction. In the absence of such a catalyst more than 8 hours is required before reaction begins, while in the presence of an initiating or catalytic amount of benzoyl peroxide bromination is complete in about 3 hours. After completion of the reaction the by-product succinimide, which is insoluble in carbon tetrachloride, is removed by filtration, washed with small portions of carbon tetrachloride and the solvent removed from the filtrate by evaporating it on a water bath. Cooling the residue results in the formation of a pale tan, crystalline mass of crude p-α-bromoethylphenyl boroxole which, on recrystallization from 1:1 benzene-cyclohexane (by volume), yields 212 g. (90% of theory) of cream-colored product. An additional recrystallization provides a white product, M.P. 183.5°–184° C.

Analysis.—Calc'd. for $C_{24}H_{24}O_3Br_3B_3$: C, 45.56; H, 3.82; Br, 37.90; B, 5.13. Found: C, 45.51; H, 3.97; Br, 38.16; B, 5.09.

The p-alpha-chloroethylphenyl boroxole is prepared by following the same procedure described above with reference to the preparation of p-alpha-bromoethylphenyl boroxole with the exception that, instead of using 1.125 moles of N-bromosuccinimide, there are employed 1.125 moles of N-chlorosuccinimide. The crude product, p-alpha-chloroethylphenyl boroxole, is purified likewise as described above with reference to the corresponding bromoethylphenyl boroxole. A good yield of purified product is obtained. This compound can be used in the same manner described below with reference to the preparation of p-vinylphenyl boronic acid from p-alpha-bromoethylphenyl boroxole.

In the application of Arthur K. Hoffmann, Serial No. 682,313, filed September 6, 1957 (i.e., concurrently with parent application Serial No. 682,312), which application has now matured into Patent No. 2,868,840, claims are made to compounds represented by the general formula II.

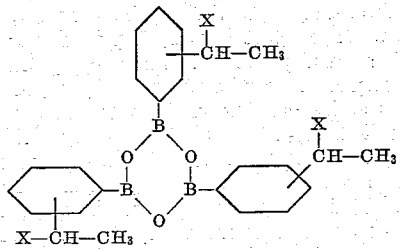

where X represents a halogen selected from the class consisting of chlorine and bromine, and to a method of preparing the same.

C. Preparation of p-vinylphenyl boroxole and p-vinylphenyl boronic acid p-α-Bromoethylphenyl boroxole, 10 g. (0.0155 mole), is placed in a 150 ml. Erlenmeyer flask to which 20 g. of a base, specifically freshly distilled quinoline is added. The reaction mixture is heated at 130°–140° C. for one-half hour with occasional stirring. During the reaction the flask is protected by a calcium sulfate drying tube. At the end of the reaction time, the flask is cooled and the contents comprising p-vinylphenyl boroxole is poured into 200 ml. of water to hydrate the boroxole. The reaction mass is acidified with aqueous hydrochloric acid and extracted with ether (diethyl ether). The ether is evaporated on the water bath and the residual, light-orange solid recrystallized from hot water in the presence of a small amount of charcoal. The yield of colorless p-vinylphenyl boronic acid (hydrated p-vinylphenyl boroxole) is 5.3 g. (74% of theory).

Instead of quinoline one can use any other base as a hydrohalide acceptor, for instance an alkali metal (e.g., sodium, potassium, lithium, etc.) or the monovalent residue of a strong, organic base, for instance, pentamethylguanidine, the strongly basic quaternary ammonium hydroxides including the various tetralkylammonium hydroxides (e.g., tetramethyl-, tetraethyl-, tetrapropylammonium hydroxides, etc.), the various tetralkanolammonium hydroxides (e.g., tetraethanolammonium hydroxide, tetrapropanolammonium hydroxide, tetrabutanolammonium hydroxide, etc.), the various benzyltrialkylammonium hydroxides (e.g., benzyltrimethylammonium hydroxide, benzyltriethylammonium hydroxide, etc.), and others that either will be apparent to those skilled in the art from the foregoing illustrative examples or can be ascertained by routine experimentation. Additional examples are calcium hydroxide, barium hydroxide, ammonium hydroxide, etc.; carbonates of inorganic bases, including the carbonates of alkali metals; other organic amines in addition to pyridine, e.g., trimethyl amine, triethyl amine, tributyl amine, dimethyl aniline, etc.; and the like.

The o- and m-vinylphenyl boronic acids are prepared from the corresponding o- and m-alpha-bromoethylphenyl boroxoles in essentially the same manner described above with reference to the preparation of p-vinylphenyl boronic acid from p-alpha-bromoethylphenyl boroxole.

EXAMPLE 2

*Preparation of o-vinylphenyl boroxole and o-vinylphenyl boronic acid* o-Alpha-bromoethylphenyl boroxole is prepared from the corresponding ortho derivative in exactly the same manner as described above with reference to the preparation of the para isomer; and o-vinylphenyl boroxole and o-vinylphenyl boronic acid are produced therefrom by following the identical procedure described under Example 1–C for the preparation of the para derivatives. The product is soluble in aqueous sodium hydroxide and absorbs bromine, showing unsaturation to be present in the molecule.

The m-vinylphenyl boroxole and m-vinylphenyl boronic acid can be similarly prepared from the corresponding meta derivatives.

The vinylphenyl boroxoles of this invention have the common characteristic that each has a boron atom which is ortho, meta or para to a vinyl group in a phenyl nucleus. Their reactivities are different from those vinyl monomers wherein the vinyl grouping is attached directly to an aliphatic chain, e.g., an aliphatic hydrocarbon chain.

This application is a division of our copending application Serial No. 682,312, filed September 6, 1957.

We claim:

1. The method of preparing a vinylphenyl boroxole which comprises dehydrohalogenating, by heating under anhydrous conditions and while admixed with a base, the corresponding alpha-X-ethylphenyl boroxole where X represents a halogen selected from the class consisting of chlorine and bromine.

2. A method as in claim 1 wherein the temperature of heating is 130°–140° C.

3. A method as in claim 1 wherein the base is quinoline.

4. The method of preparing a vinylphenyl boroxole which comprises dehydrobrominating, by heating under anhydrous conditions and while admixed with a base, the corresponding alpha-bromoethylphenyl boroxole.

5. A method as in claim 4 wherein the temperature of heating is 130°–140° C.

6. A method as in claim 4 wherein the base is quinoline.

No references cited.